United States Patent
Spampinato et al.

(10) Patent No.: US 10,178,313 B2
(45) Date of Patent: Jan. 8, 2019

(54) PANNING FILTER DEVICE, CORRESPONDING METHOD AND COMPUTER PROGRAM PRODUCT

(71) Applicant: STMicroelectronics S.r.l., Agrate Brianza (MB) (IT)

(72) Inventors: Giuseppe Spampinato, Catania (IT); Arcangelo Ranieri Bruna, Giardini Naxos (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 816 days.

(21) Appl. No.: 14/278,680

(22) Filed: May 15, 2014

(65) Prior Publication Data

US 2014/0348239 A1    Nov. 27, 2014

(30) Foreign Application Priority Data

May 21, 2013 (IT) ............... TO2013A0405

(51) Int. Cl.
*H04N 5/232* (2006.01)
*G06T 5/00* (2006.01)
*G06T 7/246* (2017.01)

(52) U.S. Cl.
CPC ......... *H04N 5/23254* (2013.01); *G06T 5/003* (2013.01); *G06T 7/246* (2017.01); *H04N 5/23248* (2013.01); *H04N 5/23251* (2013.01); *G06T 2207/20201* (2013.01)

(58) Field of Classification Search
CPC .......... H04N 5/23254; H04N 5/23248; H04N 5/23251; G06T 7/2033; G06T 5/003; G06T 2207/20201

USPC .................................................... 375/240.16
See application file for complete search history.

(56) References Cited

U.S. PATENT DOCUMENTS

2006/0170783 A1   8/2006   Stavely et al.
2014/0204227 A1   7/2014   Spampinato et al.

FOREIGN PATENT DOCUMENTS

EP          0933870 A2       8/1999
WO     WO 2007/020569 A2    2/2007

OTHER PUBLICATIONS

Egusa et al., "An Application of Fuzzy Set Theory for an Electronic Video Camera Image Stabilizer," *IEEE Transactions on Fuzzy Systems* 3(3):351-356, Aug. 1995.

(Continued)

*Primary Examiner* — William C Vaughn, Jr.
*Assistant Examiner* — Jae N Noh
(74) *Attorney, Agent, or Firm* — Seed IP Law Group

(57) ABSTRACT

A panning device for processing relative motion vectors and absolute motion vectors obtained from a video sequence, includes: a panning filter module, such as a high-pass IIR filter, for subjecting relative motion vectors to panning processing, an adder module for adding the relative motion vectors subjected to panning in the panning filter module to absolute motion vectors to obtain respective summed values of motion vectors, a clipping module for subjecting the summed values of motion vectors obtained in the adder module to clipping according to a selected cropping window for obtaining final output absolute motion vectors, a first leak integrator arranged after the panning filter module, and a second leak integrator arranged after the clipping module.

23 Claims, 2 Drawing Sheets

(56) References Cited

OTHER PUBLICATIONS

Engelsberg et al., "A Comparative Review of Digital Image Stabilising Algorithms for Mobile Video Communications," *IEEE Transactions on Consumer Electronics* 45(3):591-597, Aug. 1999.
Fei et al., "A Registration Method Based on Nature Feature with KLT Tracking Algorithm for Wearable Computers," International Conference on Cyberworlds, pp. 416-421, 2008.
Litwin, "FIR and IIR digital filters," *IEEE Potentials* 19(4):28-31, Oct./Nov. 2000.
Matsushita et al., "Full-frame Video Stabilization," *IEEE Computer Vision and Pattern Recognition* 1:50-57, 2005.
Paik et al., "An Adaptive Motion Decision System for Digital Image Stabilizer Based on Edge Pattern Matching," *IEEE Transactions on Consumer Electronics* 38(3):607-616, Aug. 1992.
Yeni et al., "Fast Digital Image Stabilization using One Bit Transform Based Sub-Image Motion Estimation," *IEEE Transactions on Consumer Electronics* 51(3):917-921, Aug. 2005.
Italian Search Report and Written Opinion dated Jan. 21, 2014 from corresponding Italian Application No. TO2013A000405.
Jackson, Leland B., "An Approach to the Implementation of Digital Filters", *IEEE Transactions on Audio and Electroacoustics*, vol. AU-16, No. 3, Sep. 1, 1968, pp. 413-421.

PANNING FILTER DEVICE, CORRESPONDING METHOD AND COMPUTER PROGRAM PRODUCT

CROSS REFERENCE TO RELATED APPLICATIONS

This application claims the priority benefit of Italian Patent Application No. TO2013A000405, filed May 21, 2013, and which application is hereby incorporated by reference to the maximum extent allowable by law.

TECHNICAL FIELD

This disclosure relates to panning filtering techniques, e.g. for distinguishing between wanted and unwanted motion in image and video processing.

Various embodiments may apply to the stabilization of video sequences, optionally using feature-based algorithms.

TECHNOLOGICAL BACKGROUND

Video stabilization aims at compensating user hand shaking e.g. in order to avoid grabbing unintended motion in a video sequence, which may cause a video sequence to be too unpleasant to be viewed.

Conventional approaches to stabilization of video sequences using feature-based algorithms (as presented e.g. in F. Teng, X. Liang, Z. He, G. Hua, "A Registration Method Based on Nature Feature with KLT Tracking Algorithm for Wearable Computers", International Conference on Cyberworlds, pp. 416-421, 2008) may involve steps such as:
 feature extraction;
 feature matching;
 outliers removal;
 motion model estimation, using inliers found.

After these steps, given the camera motion, a final "panning filter" procedure may separate the intended and unintended motion.

An exemplary arrangement of this type is disclosed e.g. in Italian Patent application TO2013A000059 in the name of the same Applicants.

Various solutions may be based on the assumption that high frequency motion may be jitter and low-frequency motion may be intended. Various procedures may thus use a low-pass filter to identify the intended motion and then compensate for the remaining high frequency motion by translating the video frame in the reverse direction of the jitter.

While capable of leading to good results, various panning filter techniques as proposed, for example, in:
 A. Engelsberg, G. Schmidt, "A comparative review of digital image stabilising algorithms for mobile video communications", IEEE Transaction of Consumer Electronics, vol. 45, no. 3, pp. 591-597, June 1999;
 J. K. Paik, Y C. Park, D. W. Kim, "An adaptive motion decision system for digital image stabilizer based on edge pattern matching", IEEE Transaction of Consumer Electronics, vol. 38, no. 3, pp. 607-616, August 1992;
 Y. Egusa, H. Akahori, A. Morimura, N. Wakami, "An application of fuzzy set theory for an electronic video camera image stabilizer", IEEE Transaction of Fuzzy Systems, vol. 3, no. 3, pp. 351-356, August 1995;
 A. A. Yeni S. Erturk, "Fast digital image stabilization using one bit transform based sub-image motion estimation", IEEE Transaction of Consumer Electronics, vol. 51, no. 3, pp. 917-921, August 2005; and
 Y. Matsushita, E. Ofek, X. Tang, H. Y Shum, "Full-frame video stabilization", IEEE Computer Vision and Pattern Recognition, 2005, vol. 1, pp. 50-57;
may exhibit operating problems leading to the panning action (normal and/or at a particular speed) being adversely affected under certain circumstances.

SUMMARY

Embodiments provide a novel and robust panning filter solution which overcomes such problems and may be implemented with low power consumption, thus becoming adapted for use also in small and/or video cameras.

Various embodiments include a device having the features set forth in the claims that follow. Various embodiments may also relate to corresponding method as well as to a computer program product, loadable into the memory of at least one computer and including software code portions for performing the steps of the method when the product is run on at least one computer. As used herein, such a computer program product is intended to be equivalent to a computer readable medium containing instructions for the control of the computing system, so as to coordinate the execution of a method according to the invention.

The claims are an integral part of the disclosure provided herein.

Various embodiments may provide a low-cost panning filter for video stabilization, easily adapted for real-time processing, offering one or more of the following advantages:
 good ability to follow user intended motion;
 reduced overshoot problems;
 flexibility, so that various embodiments may be used in any kind of panning filter in any video stabilization procedure.

According to one embodiment, there is provided a panning device for processing relative motion vectors and absolute (accumulator) motion vectors obtained from a video sequence, including a panning filter module for subjecting relative motion vectors to panning processing, an adder module for adding the relative motion vectors subjected to panning in said panning filter module to absolute motion vectors to obtain respective summed values of motion vectors, a clipping module for subjecting the summed values of motion vectors obtained in said adder module to clipping according to a selected cropping window for obtaining final output absolute motion vectors, a first leak integrator arranged after the panning filter module for operating on said relative motion vectors subjected to panning, and a second leak integrator arranged after the clipping module for operating on said final output absolute motion vectors.

According to an embodiment, the first and second leak integrator include a check module configured for checking if a motion vector value input thereto is outside a given range, and in the positive, decreasing said motion vector value, in the negative, increasing said motion vector value.

According to an embodiment, the decreasing or increasing is by steps.

According to an embodiment, the first leak integrator is configured for operating on said relative motion vectors subjected to panning only when the respective absolute motion vector exceeds by a given amount, preferably by three times, the cropping value of said cropping window.

According to an embodiment, the second leak integrator is configured for operating on said final output absolute motion vectors when the respective absolute motion vector reaches the cropping value of said cropping window.

According to an embodiment, the panning filter module includes an Infinite Impulse Response or IIR filter, preferably a second-order high-pass IIR filter.

According to an embodiment, the panning filter module includes second-order Butterworth IIR high-pass filter, preferably with a cutoff frequency at or in the vicinity of 0.40 Hz.

According to an embodiment, the panning filter module (10) is frame-rate (F) dependent on the frame rate of said video sequence.

According to an embodiment, the is provided a method of processing relative motion vectors and absolute (accumulator) motion vectors obtained from a video sequence, including: subjecting said relative motion vectors to panning processing, adding the relative motion vectors subjected to panning to said absolute motion vectors to obtain respective summed values of motion vectors, subjecting said summed values of motion vectors to clipping according to a selected cropping window for obtaining final output absolute motion vectors, leak integration of said relative motion vectors subjected to panning before adding to said absolute motion vectors, and leak integration of said final output absolute motion vectors.

According to an embodiment, there is provided a computer program product, loadable in the memory of at least one computer and including software code portions for implementing the method when run on said at least one computer.

BRIEF DESCRIPTION OF THE FIGURES

Various embodiments will now be described, by way of example only, with reference to the annexed figures, wherein.

DETAILED DESCRIPTION

In the following description, numerous specific details are given to provide a thorough understanding of exemplary embodiments. The embodiments can be practiced without one or more of the specific details, or with other methods, components, materials, etc. In other instances, well-known structures, materials, or operations are not shown or described in detail to avoid obscuring aspects of the embodiments. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings and references provided herein are for the convenience of the reader only and do not interpret the scope or meaning of the embodiments.

Figure 1:
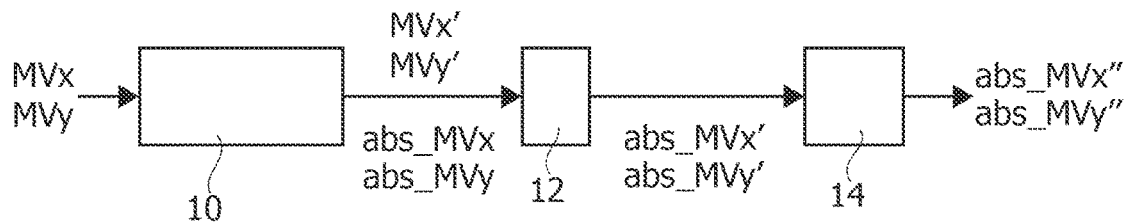
FIG. 1 is a block diagram of a panning filter arrangement.

FIG. 1 is a block diagram of a panning filter arrangement. The principles regulating operation of such an arrangement can be derived from various documents as cited in the introductory portion of this description, which makes it unnecessary to provide a more detailed description herein.

For the purposes herein, it will suffice to recall that operation of an arrangement as illustrated in FIG. 1 may involve processing relative motion vectors MVx and MVy obtained, together with absolute motion vectors abs_MVx and abs_MVy from a video sequence including (digital) images/frames produced by a video capture device such as a video camera, not visible in the figures.

In brief, in one or more embodiments, the motion vectors MVx and MVy may be representative of the displacements between two adjacent frames in the horizontal and vertical directions, respectively, while abs_MVx and abs_MVy may be regarded as representative of the accumulators of MVx and MVy between a first frame and the current frame in a set of frames.

Obtaining such relative motion vectors MVx and MVy and absolute (accumulated) motion vectors abs_MVx and abs_MVy from images/frames may be by any conventional manner known in the art for that purpose. For instance, reference may be made in that respect to Italian patent application TO2013A000059 in the name of the same Applicants, already mentioned in the foregoing.

Processing relative motion vectors MVx and MVy as exemplified in FIG. 1 may involve:
feeding the relative motion vectors MVx and MVy to a panning filter module 10,
feeding the (relative) motion vectors MVx and MVy subjected to panning in the filter 10 (i.e. MVx' and MVy' in FIG. 1) to an adder module 12 to be added to the absolute motion vectors abs_MVx and abs_MVy to obtain summed values abs_MVx' and abs_MVy', respectively, and
subjecting the summed values abs_MVx' and abs_MVy' to clipping according to a selected cropping window (e.g. a cropping window having a given cropping value) in a clipping module 14 to obtain final output absolute motion vectors abs_MVx" and abs_MVy".

It was observed that certain problems may arise when using panning filter solutions as generally considered in the foregoing.

For instance (this may occur if an Infinite Impulse Response or IIR filter is used in an arrangement as considered in the foregoing) oscillations may be observed if the camera is stopped while a panning is being made. This occurrence might be dealt with by forcing the filter to stop, when the input taps are zeroes and there is a passage of the absolute motion vector from one direction to another one (that is from negative to positive values or vice-versa), without any kind of delay.

A more critical event to deal with is overshoot, e.g. when in the scene there is a speed panning with a sudden stop; in that case an oscillation may be observed in the output video before stabilization resumes regularly.

One or more embodiments may deal with this situation by resorting to leak integrators.

For instance, FIG. 2 (where parts or elements identical or equivalent to parts or elements already described in connection with FIG. 1 are indicated with the same references) presents an exemplary embodiment with two leak integrators 16' and 16" added to the basic layout of FIG. 1.

As well known the designation leak integrator (or leaky integrator) is used to indicate a component or system that takes the integral of an input, but gradually "leaks" a small amount of input over time.

Figure 2:
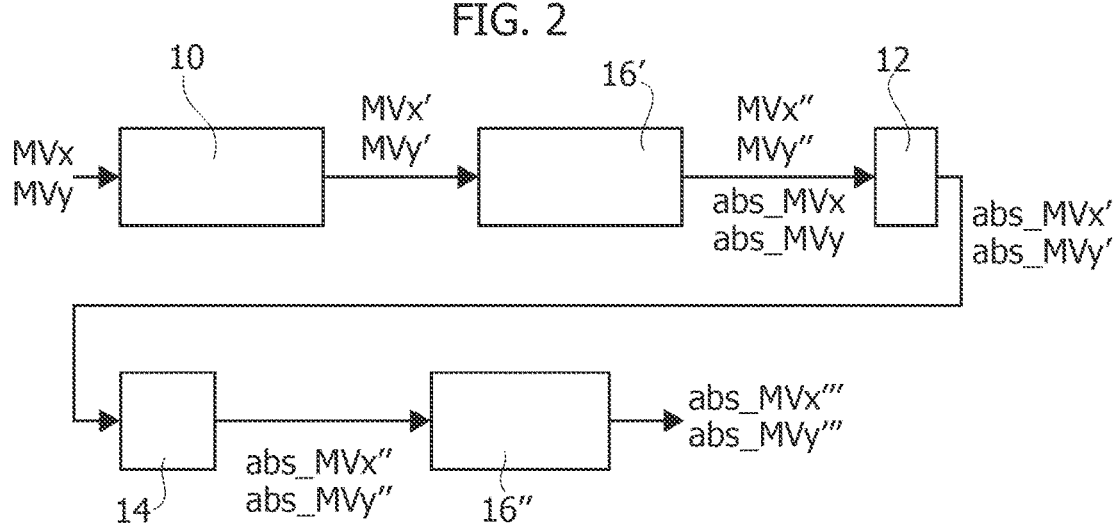
FIG. 2 is a block diagram of an overshoot reduction panning filter.

In the exemplary embodiment of FIG. 2:

a first leak integrator 16' is arranged after the panning filter 10 (e.g. interposed between the panning filter 10 and the adder 12) with the purpose of tuning the value of relative motion vectors MVx' and MVy' subjected to panning in the panning filter 10 to produce "tuned" values MVx" and MVy" to be added to the absolute motion vectors abs_MVx and abs_MVy, and a second leak integrator 16" is arranged after (e.g. cascaded to) the clip module 14 with the purpose of tuning the value of the absolute motion vectors abs_MVx" and abs_MVy" to produce "tuned" absolute motion vectors abs_MVx'" and abs_MVy'".

Figure 3:
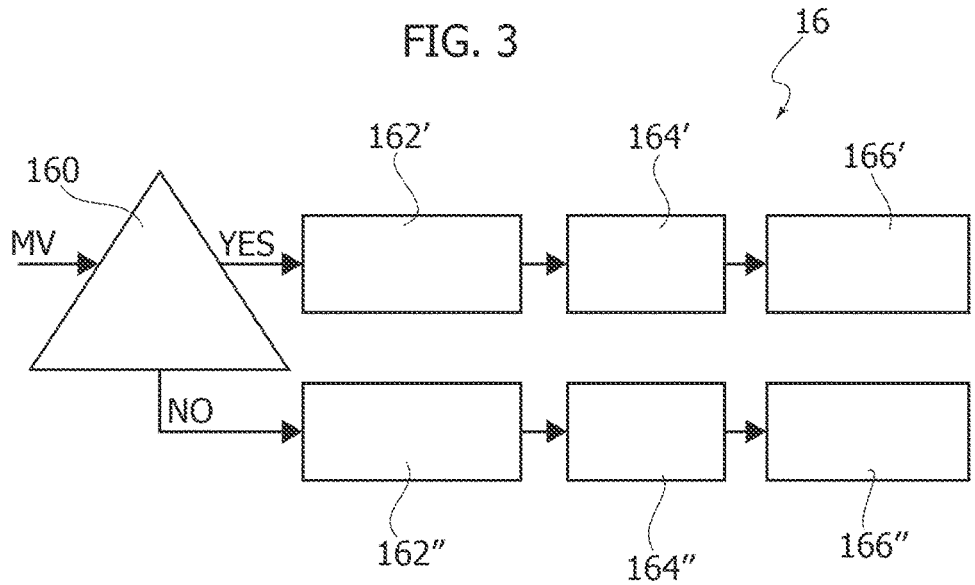
FIG. 3 is a block diagram of leak integrator scheme.

FIG. 3 is exemplary of possible operation of such a leak integrator 16.

Reference 16 is used to indicate that the exemplary disclosure herein may apply to either of both of integrators 16' and 16".

This under the proviso that (in addition to possibly adopting different values for parameters such as e.g. max_range and/or step—see Table 1 below), the integrators 16' and 16" may operate on an input motion vector MV which is a relative motion vector (e.g. MVx' or MVy'—for 16') and an absolute (accumulated) motion vector (e.g. abs_MVx" or abs_MVy"—for 16"), respectively.

In a check module 160 a test is made as to whether the input to the leak integrator 16 that is a single (possibly absolute) motion vector MV is outside a chosen range max_range.

In the positive (e.g. outcome YES of module 160), in a module 162' the motion vector (relative or absolute) will be reduced (decreased) by a step i.e. leak=leak−step to slow down the rest of the panning procedure.

Otherwise (e.g. outcome NO of module 160), in a module 162" the motion vector (relative or absolute) will be increased by a step i.e. leak=leak+step to facilitate alignment to the complete movement again.

In various embodiments (see e.g. Table 1 below) the value of step for the first leak integrator 16' may be different (e.g. larger) from the value of step for the second leak integrator 16".

In various embodiments, the value of step used for decreasing the motion vector may be different from the value of step for increasing the motion vector.

The block diagram of FIG. 3 is exemplary of the rest of the procedure as implemented in the leak integrator 16 including clipping leak to min_leak or max_leak (at 164' and 164", respectively) and setting MV'=MV*leak at 166' and 166" by using the respective values determined for leak at 164' and 164".

Various embodiments may provide that, in normal conditions, that is when panning is not so fast to exceed the max_range, the procedure may operate in compliance with conventional panning filter solutions.

Table 1 below lists some exemplary values for parameters which may be used in the two different leak integrators of FIG. 2 (Leak Integrator 1=16'; Leak Integrator 2=16").

TABLE 1

Exemplary Leak Integrator values

| Variables | Leak Integrator 1 | Leak Integrator 2 |
|---|---|---|
| MV | relative MV | absolute MV |
| starting leak | 1.0 | 1.0 |
| max_range | cropping * 3 | cropping |
| step | 0.3 | 0.05 |
| leak_max | 1.0 | 1.0 |
| leak_min | 0.1 | 0.1 |

In various embodiments, the first leak integrator 16' (operating on relative motion vectors) may be configured to operate only if the absolute motion vector exceeds by a given amount e.g. is (at least) three times the cropping value and has got a really fast step.

In various embodiments, the second leak integrator 16" (operating on absolute motion vectors) may be configured to operate only when the absolute motion vector just reaches the cropping value and has got a really slow step. This allows a sporadic and speed modification of MVs when—in the case of speed panning—and a punctual and slow following of normal movement—when panning stops.

While various embodiments may include different types of filter as the panning filter 10, certain embodiments may adopt a Infinite Impulse Response (IIR).

A general form of an IIR filter transfer function may be expressed (in z transform notation) as:

$$H(z) = \frac{\sum_{l=0}^{L-1} b_l z^{-1}}{1 + \sum_{m=1}^{M} a_m z^{-m}}$$

A related issue may involve determining the coefficients $b_1$ and $a_m$ so that H(z) satisfies given specifications.

Various embodiments may adopt a second-order IIR filter as a judicious trade-off between implementation cost and results.

Figure 4:
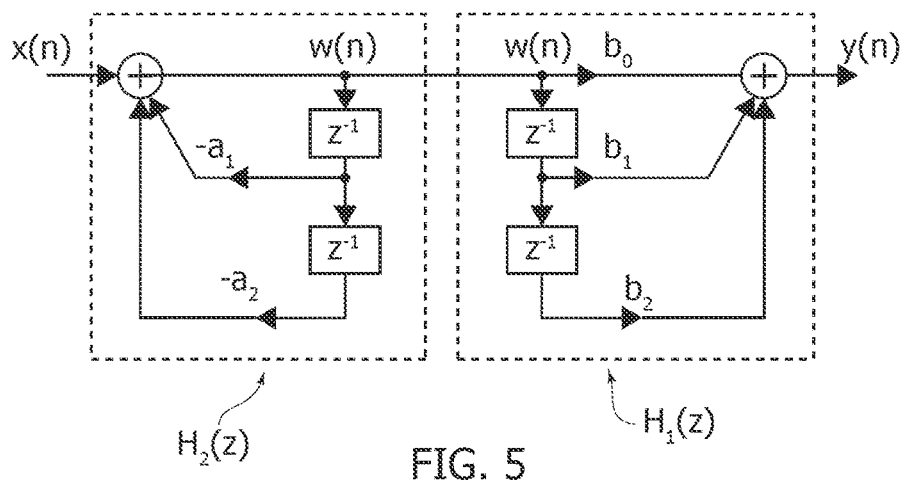
FIGS. 4 and 5 are exemplary of signal flow in embodiments.

A so called Direct Form-II (canonical form) realization as schematically represented in FIG. 4 may require the smallest number of delays (denoted $z^{-1}$), adders (denoted "+") and multipliers (denoted simply by the relative coefficients $b_1$ and $a_m$).

In that case, the IIR filter may be seen as including a cascade of two transfer functions $H_1(z)$ and $H_2(z)$:

$$H(z) = H1(z)H2(z)$$
$$H_1(z) = b_0 + b_1 z^{-1} + b_2 z^{-2}$$
$$H_2(z) = \frac{1}{1 + a_1 z^{-1} + a_2 z^{-2}}$$

In this manner H(z) has the signal flow indicated in FIG. 4.

Figure 5:
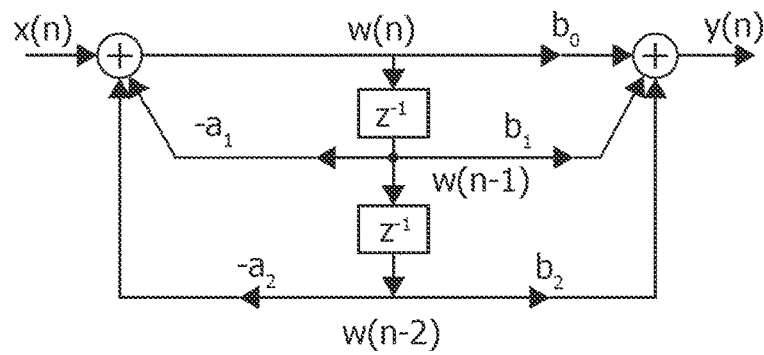

Based on the criteria disclosed e.g. in L. Litwin, "FIR and IIR digital filters", IEEE Potentials, Volume 19, Issue 4, pp. 28-31, October/November 2000, delays can be shared between the first and the second sub system, this resulting in the representation of FIG. 5, where delays, adders and multiplies are again denoted $z^{-1}$, "+" and by the relative coefficients $b_1$ and $a_m$.

Various embodiments may thus adopt a 2nd order Butterworth IIR high-pass filter, direct form II, with cutoff frequency of 0.40 Hz, which was experimented to provide satisfactory results over a large set of video sequences.

It was observed that a IIR high pass filter (e.g. of order 2 with a cut-off frequency at or in the vicinity of 0.4 Hz) may also exhibit a lower group delay and require lower taps than a FIR.

An exemplary filter which is also frame rate (F) dependent (for a better panning handling) may be obtained from the following MatLab code:

[b,a]=butter(2,0.4/(F/2),'high');

In practical implementations, where the frame rate may vary e.g. from 1 to 30, by considering four coefficients for each IIR HPF of order 2 (one coefficient is repeated), this results in 30×4=120 (additional) coefficients to store in a Look-Up Table (LUT), which is acceptable.

Such a filter, having a ideally flat magnitude response starting from the cutoff frequency is obtainable e.g. with the MatLab "Filter Design and Analysis Tool", with the following coefficients:
Numerator:
0.93137885812298193
−1.8627577162459639
0.93137885812298193
Denominator:
1
−1.85804329870026
0.86747213379166921

Figure 6:
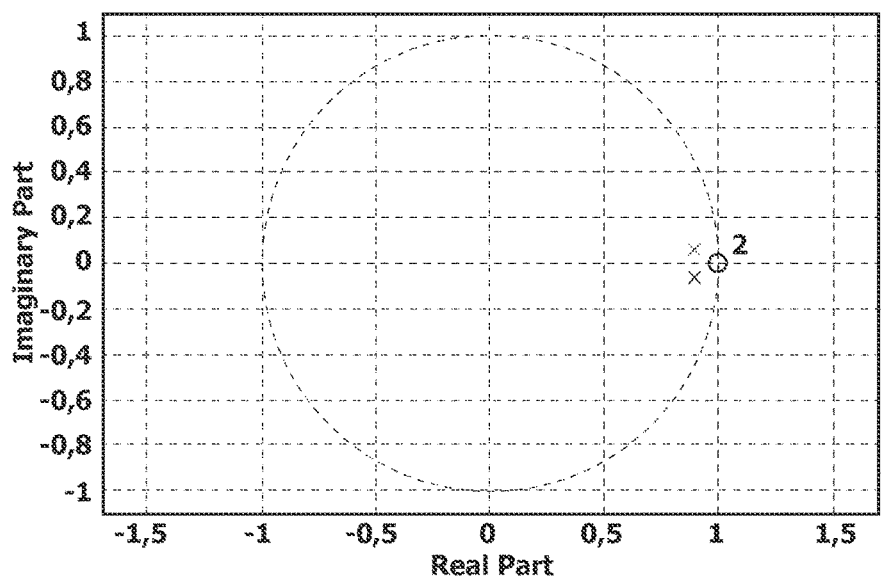
FIG. 6 is a zero-pole graph of exemplary embodiments.

The zeroes-poles graph of such an exemplary filter is represented in FIG. 6: zeros and poles are very close to the unit circle, so the IIR filter is particularly sensitive to finite precision effects, mainly due to the feedback nature of the IIR structure itself.

Experiments to verify the effectiveness of embodiments herein may include the following.

At the beginning of a sequence a frame is cropped, so that the stabilized frame is in the middle of the scene. When there is a speed panning movement, the stabilized frame may not be in line with the middle of the scene, but with leak integrators it will be situated in a better position. At the end of the speed panning movement with leak integrators, the stabilized frame will be very close to the center (middle) of the scene; this is in contrast with conventional cases where the stabilized frame may not be in a "good" position. At this point, with leak integrators stabilization will progress regularly, while in conventional cases, in order to compensate delay, the stabilized frame may start some oscillations and will reach a satisfactory position only after a number of frames.

Without prejudice to the underlying principles of the invention, the details and embodiments may vary, even appreciably, with respect to what has been described by way of example only, without departing from the extent of protection. The extent of protection is defined by the annexed claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A panning device, comprising:
a panning filter, which, in operation, subjects relative motion vectors of a video sequence to panning processing;
a first leaky integrator coupled to an output of the panning filter, wherein the first leaky integrator, in operation, processes relative motion vectors processed by the panning filter;
an adder coupled to an output of the first leaky integrator, wherein the adder, in operation, adds relative motion vectors output by the first leaky integrator to absolute motion vectors of the video sequence to obtain respective summed values of motion vectors;
clipping circuitry, which, in operation, clips the summed values of motion vectors obtained in said adder based on a cropping window, obtaining output absolute motion vectors; and
a second leaky integrator coupled to an output of the clipping circuitry, which, in operation, processes the output absolute motion vectors.

2. The panning device of claim 1 wherein the first leaky integrator, in operation,
determines whether a relative motion vector value is outside a given range,
when the relative motion vector value is above the given range, decreases said relative motion vector value; and
when the relative motion vector value is below the given range, increases said relative motion vector value.

3. The panning device of claim 2 wherein said decreasing or increasing is by steps.

4. The panning device of claim 1 wherein the first leaky integrator, in operation, processes a relative motion vector by determining whether a value of a respective absolute motion vector of the input video sequence exceeds a cropping value of said cropping window by a multiple of the cropping value and selectively adjusting the relative motion vector based on the determination.

5. The panning device of claim 1 wherein the second leaky integrator, in operation, processes an output absolute motion vector by determining whether a value of the output absolute motion vector reaches a cropping value of said cropping window and selectively adjusting the output absolute motion vector based on the determination.

6. The panning device of claim 1 wherein the panning filter includes an Infinite Impulse Response (IIR) filter.

7. The panning device of claim 6 wherein the panning filter includes second-order Butterworth IIR high-pass filter.

8. The panning device of claim 1 wherein the panning filter is frame-rate dependent on a frame rate of said video sequence.

9. The panning device of claim 4 wherein the multiple is three.

10. The panning device of claim 6 wherein the IRR filter is a second-order high-pass IIR filter.

11. The panning device of claim 7 wherein the Butterworth IIR high-pass filter has a cutoff frequency of 0.40 Hz.

12. The panning device of claim 1 wherein the first leaky integrator, in operation:
compares a magnitude of a relative motion vector to a threshold range; and
selectively adjusts the magnitude of the relative motion vector based on the comparison.

13. The panning device of claim 1 wherein the second leaky integrator, in operation:
compares a magnitude of an output absolute motion vector to a threshold range; and selectively adjusts the magnitude of the output absolute motion vector based on the comparison.

14. A method, comprising:
subjecting relative motion vectors of a video sequence to panning processing;
adding relative motion vectors subjected to panning to respective absolute motion vectors of the video sequence to obtain respective summed values of motion vectors;
clipping said summed values of motion vectors based on a cropping window, obtaining output absolute motion vectors;
selectively applying leaky integration to said relative motion vectors subjected to panning before the adding; and
selectively applying leaky integration to said output absolute motion vectors.

15. The method of claim 14 wherein the selectively applying leaky integration to said relative motion vectors comprises:
comparing a magnitude of a relative motion vector to a threshold range; and
selectively adjusting the magnitude of the relative motion vector based on the comparison.

16. The method of claim 14 wherein when the magnitude of the relative motion vector value is above the threshold range, the magnitude of said relative motion vector value is decreased, and when the magnitude of the relative motion vector value is below the threshold range, the magnitude of the relative motion vector value is increased.

17. The method of claim 14 wherein the selectively applying leaky integration to said output absolute motion vectors comprises:
comparing a magnitude of an output absolute motion vector to a threshold range; and
selectively adjusting the magnitude of the output absolute motion vector based on the comparison.

18. A non-transitory computer-readable medium having contents which configure an image processing system to perform a method, the method comprising:
subjecting relative motion vectors of a video sequence to panning processing;
adding relative motion vectors subjected to panning to respective absolute motion vectors of the video sequence to obtain respective summed values of motion vectors;
clipping said summed values of motion vectors based on a cropping window, obtaining output absolute motion vectors;
selectively applying leaky integration to said relative motion vectors subjected to panning before the adding; and
selectively applying leaky integration to said output absolute motion vectors.

19. The non-transitory computer-readable medium of claim 18 wherein the selectively applying leaky integration to said relative motion vectors comprises:
comparing a magnitude of a relative motion vector to a threshold range; and
selectively adjusting the magnitude of the relative motion vector based on the comparison.

20. The non-transitory computer-readable medium of claim 18 wherein the contents comprise instructions executable by a processing device of the image processing system.

21. A system, comprising:
an image sensor; and
image processing circuitry, which, in operation:
subjects relative motion vectors of a video sequence to panning processing;
adds relative motion vectors subjected to panning to respective absolute motion vectors of the video sequence to obtain respective summed values of motion vectors;
clips said summed values of motion vectors based on a cropping window, obtaining output absolute motion vectors;
selectively applies leaky integration to said relative motion vectors subjected to panning before the adding; and
selectively applies leaky integration to said output absolute motion vectors.

22. The system of claim 21 wherein the image processing circuitry comprises:
a panning filter;
a first leaky integrator coupled to an output of the panning filter;
an adder coupled to an output of the first leaky integrator;
clipping circuitry, which, in operation, clips the summed values of motion vectors obtained in said adder based on a cropping window, obtaining output absolute motion vectors; and
a second leaky integrator coupled to an output of the clipping circuitry.

23. The system of claim 21 wherein the selectively applying leaky integration to said relative motion vectors comprises:
comparing a magnitude of a relative motion vector to a threshold range; and
selectively adjusting the magnitude of the relative motion vector based on the comparison.

* * * * *